US012532285B2

United States Patent
Salkintzis et al.

(10) Patent No.: US 12,532,285 B2
(45) Date of Patent: Jan. 20, 2026

(54) DETERMINING AN ACCESS NETWORK RADIO ACCESS TYPE

(71) Applicant: Lenovo (Singapore) Pte. Ltd., New Tech Park (SG)

(72) Inventors: Apostolis Salkintzis, Athens (GR); Dimitrios Karampatsis, Ruislip (GB); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 377 days.

(21) Appl. No.: 17/904,275

(22) PCT Filed: Feb. 13, 2020

(86) PCT No.: PCT/EP2020/053807
§ 371 (c)(1),
(2) Date: Aug. 15, 2022

(87) PCT Pub. No.: WO2021/160272
PCT Pub. Date: Aug. 19, 2021

(65) Prior Publication Data
US 2023/0078563 A1 Mar. 16, 2023

(51) Int. Cl.
*H04W 92/02* (2009.01)
*H04W 60/00* (2009.01)

(52) U.S. Cl.
CPC ............ *H04W 60/00* (2013.01); *H04W 92/02* (2013.01)

(58) Field of Classification Search
CPC ..... H04W 60/00; H04W 92/02; H04W 48/18; H04W 88/06; H04W 60/04
See application file for complete search history.

(56) References Cited

U.S. PATENT DOCUMENTS 10,779,255 B2 * 9/2020 Bakker ................... H04W 8/18
10,986,481 B2 * 4/2021 Salkintzis ............. H04W 12/06
(Continued)

FOREIGN PATENT DOCUMENTS

EP 3697119 A1 8/2020
WO 2019096287 A1 5/2019

OTHER PUBLICATIONS

PCT/EP2020/053807, "Notification of Transmittal of the International Search Report and the Written Opinion of the International Searching Authority, or the Declaration", Dec. 22, 2020, pp. 1-42.
(Continued)

*Primary Examiner* — Kenneth T Lam
(74) *Attorney, Agent, or Firm* — Kunzler Bean & Adamson

(57) ABSTRACT

Apparatuses, methods, and systems are disclosed for determining a RAT for an untrusted access network. One apparatus includes a processor and a transceiver that communicates with a first access network. The processor obtains ANI about the first access network, the ANI including an access technology type for the first access network. The processor determines to register with a mobile communication network (e.g., a 5GC) via the first access network using an untrusted registration procedure and sends a first request (e.g., an IKE_AUTH Request) to establish a secure connection with a N3IWF in the mobile communication network. Here, the first request includes a registration request for the mobile communication network and the obtained ANI, wherein the obtained ANI is used by the mobile communication network to determine a RAT for the first access network. Via the transceiver, the processor receives a response to the registration request after establishing the secure connection with the N3IWF, wherein the response depends on the RAT.

16 Claims, 11 Drawing Sheets

(56) References Cited

U.S. PATENT DOCUMENTS

| | | | | |
|---|---|---|---|---|
| 2018/0288582 A1* | 10/2018 | Buckley | ............... | H04W 12/06 |
| 2019/0208562 A1* | 7/2019 | Kim | ...................... | H04W 76/16 |
| 2019/0320381 A1* | 10/2019 | Niemi | ................... | H04W 8/183 |
| 2020/0280435 A1* | 9/2020 | Lehtovirta | ............ | H04L 9/0822 |
| 2021/0076301 A1* | 3/2021 | Yu | ........................ | H04W 48/02 |
| 2021/0136582 A1* | 5/2021 | Liu | ......................... | H04W 8/08 |
| 2021/0211958 A1* | 7/2021 | Zhu | ....................... | H04W 36/08 |
| 2022/0225082 A1* | 7/2022 | Zhang | ................... | H04W 48/16 |
| 2022/0330195 A1* | 10/2022 | Chen | .................. | H04W 60/005 |

OTHER PUBLICATIONS

3GPP, "3rd Generation Partnership Project; Technical Specification Group Services and System Aspects; Procedures for the 5G System (5GS); Stage 2 (Release 15)", 3GPP TS 23.502 V15.8.0 Dec. 2019, pp. 1-360.

Apple Inc., "Control Plane signalling solution for S2b", SA WG2 Meeting #106 S2-144200, Nov. 17-21, 2014, pp. 1-10.

Motorola Mobility, Lenovo, "Specification of AN Parameters for Non-3GPP Access", SA WG2 Meeting #126 62-181640, Feb. 26-Mar. 2, 2018, pp. 1-6.

Qualcomm Incorporated, "Adding NID to AN parameters for N3IWF access to SNPN", 3GPP TSG-SA WG2 Meeting #135 S2-1908789, Oct. 14-18, 2019, pp. 1-4.

Sa2, "Ls on Reply to General Status of Work", 3GPP TSG SA WG2 Meeting #136AH S2-2001124, Jan. 13-17, 2020, pp. 1-2.

3Gpp, "3rd Generation Partnership Project; Technical Specification Group Services and System Aspects; Study on the Wireless and Wireline Convergence for the 5G system architecture (Release 16)", 3GPP TR 23.716 V16.0.0, Dec. 2018, pp. 1-184.

\* cited by examiner

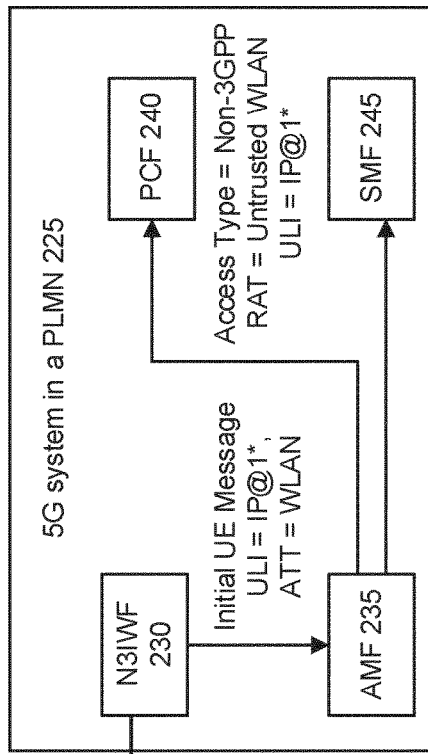
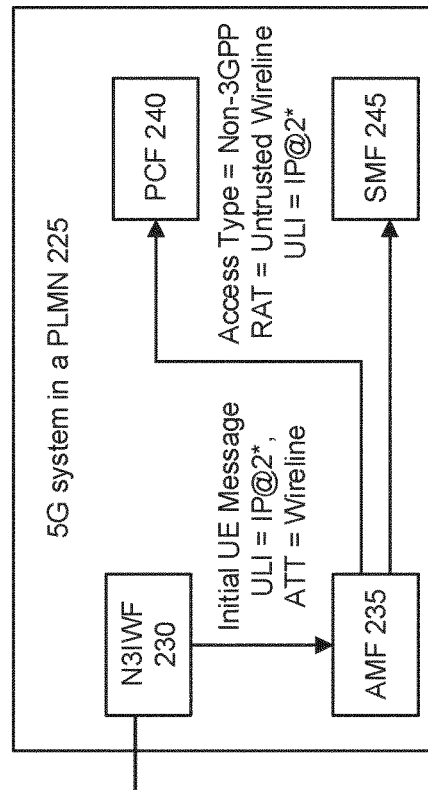
FIG. 2A
FIG. 2B

DETERMINING AN ACCESS NETWORK RADIO ACCESS TYPE

The subject matter disclosed herein relates generally to wireless communications and more particularly relates to determining a radio access technology type, e.g., of an untrusted access network.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Access Network Information ("ANI"), Application Programming Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), User Location Information ("ULI"), Wireless Local Area Network ("WLAN"), and Worldwide Interoperability for Microwave Access ("WiMAX").

In certain embodiments, a UE may connect to a 5G core in a PLMN via several types of untrusted non-3GPP access networks, all of them providing IP connectivity between the UE and a Non-3GPP Interworking Function (N3IWF) in the 5G core ("5GC"). However, when a UE accesses the 5GC via an N3IWF, the 5GC does not know what type of untrusted non-3GPP access network is used by the UE.

BRIEF SUMMARY

Methods for determining a RAT for an untrusted access network are disclosed. Apparatuses and systems also perform the functions of the methods.

One method of a UE for determining a RAT for an untrusted access network includes obtaining ANI about a first access network, the ANI including an access technology type for the first access network. The method includes determining to register with a mobile communication network via the first access network using an untrusted registration procedure and sending a first request to establish a secure connection with a N3IWF in the mobile communication network. Here, the first request includes a registration request for the mobile communication network and the obtained ANI, wherein the obtained ANI is used by the mobile communication network to determine a RAT for the first access network. The method includes receiving a response to the registration request after establishing the secure connection with the N3IWF, wherein the response depends on the RAT.

One method of a N3IWF for determining a RAT for an untrusted access network includes receiving a first request from a remote unit to establish a secure connection. Here, the first request includes a registration request for a mobile communication network, a first source address and ANI about the first access network. The method includes validating the ANI using the first source address and the ANI and sending a first message to the AMF including the registration request and the ANI, where the ANI is used by the AMF to determine a RAT for the first access network, and where the mobile communication network processes the registration request based on the determined RAT.

One method of an AMF for determining a RAT for an untrusted access network includes receiving a first message via a N3IWF including a registration request for a remote unit connected to the N3IWF via a first access network. Here, the first message also includes ANI about the first access network. The method includes determining a RAT for the first access network using the ANI. The method includes determining whether to accept the registration request based on the determined RAT and sending to the remote unit a response to the registration request.

Another method of a N3IWF for determining a RAT for an untrusted access network includes receiving a first request from a remote unit to establish a secure connection. Here, the first request includes a registration request for a mobile communication network and a first source address. The method includes obtaining ANI about the first access network including an access technology type for the first access network using the first source address and sending a first message to an AMF. In such embodiments, the first message includes the registration request and the obtained ANI, wherein the obtained ANI is used by the AMF to determine a RAT for the first access network, and wherein the mobile communication network processes the registration request based on the determined RAT.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A is a diagram illustrating one embodiment of a network deployment for determining a RAT for an untrusted access network;

FIG. 2B is a diagram illustrating another embodiment of a network deployment for determining a RAT for an untrusted access network;

DETAILED DESCRIPTION

Figure 1:
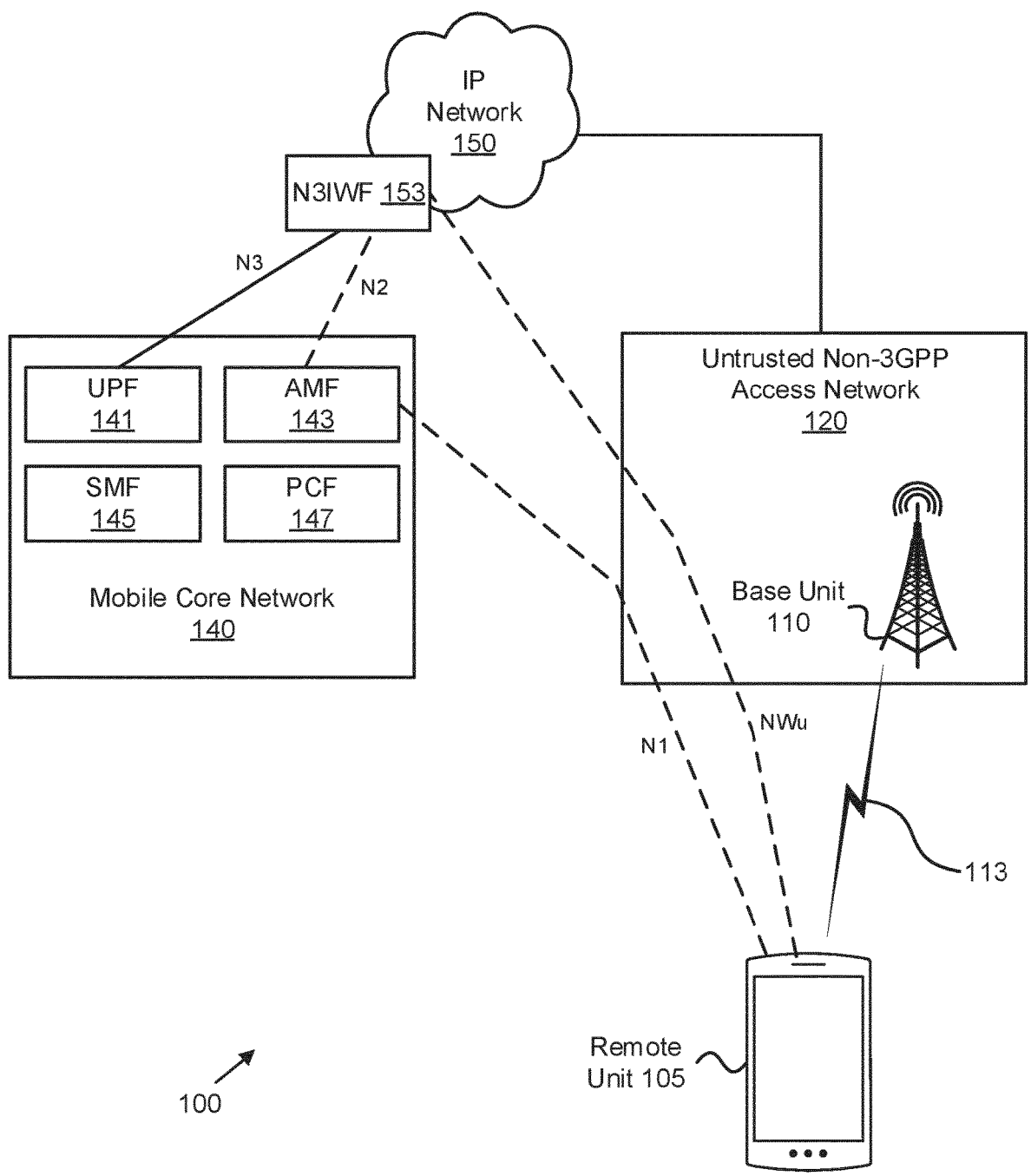
FIG. 1 is a diagram illustrating one embodiment of a wireless communication system for determining a RAT for an untrusted access network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for determining a RAT for an untrusted access network. As specified in the current 5G specifications (see e.g. 3GPP TS 23.501 v16.3.0 and 3GPP TS 23.502 v16.3.0), a UE may connect to a 5G core in a PLMN via several types of, so-called, untrusted non-3GPP access networks, all of them providing IP connectivity between the UE and a Non-3GPP Interworking Function ("N3IWF") in the 5G system. Note that the N3IWF may be deployed as part of the 5G core. Alternatively, the N3IWF may be deployed as part of the access network. These access networks are deemed as untrusted from the 5G core network point of view because they do not support any secure signaling interfaces or any interworking with the 5G core network. Also, they are deemed as non-3GPP access networks because they support connectivity to the 5G core via an N3IWF, which was designed to support interworking with untrusted non-3GPP accesses. Nevertheless, some of these access networks may provide 3GPP-based radio connectivity, such as NR or E-UTRA.

The problem considered in this disclosure is that, when a UE accesses the 5GC via an N3IWF, the 5GC does not know what type of untrusted non-3GPP access network is used by the UE. For example, the 5GC does not know whether the UE is using a Wi-Fi access network, a wireline access network, or an SNPN. The 5GC only knows that the UE is using untrusted non-3GPP access but cannot determine the type of untrusted non-3GPP access network.

As specified in the current 5G specifications, when a UE registers to 5GC via an N3IWF (i.e. via an untrusted non-3GPP access network), the N3IWF sends to AMF only User Location Information (ULI) for the UE and the AMF applies always the same Access Type (="Non-3GPP") and the same Radio Access Type (="Virtual"). The "Virtual" Radio Access Type (RAT) means that the 5GC knows only that the UE is using untrusted non-3GPP access but does not know the precise RAT being used by the UE.

In contrast, when the UE is using trusted non-3GPP access and connects to 5GC via a Trusted Non-3GPP Gateway Function (TNGF), the 5GC knows whether the UE is using WLAN access or wireline access. Note that, in this case, a TNGF is used (instead of a N3IWF) and there is a signaling interface (Ta) between the trusted non-3GPP access network and the TNGF. Via this signaling interface the TNGF receives User Location Information (ULI) which depends on the type of trusted non-3GPP access. In case of a trusted WLAN access, the ULI indicates the SSID and the BSSID of the WLAN, while, in case of trusted Wireline access, the ULI indicates the Global Line Identity (GLI) or the Global Cable Identity (GCI) of the fixed line where the UE is connected to. The AMF derives the RAT based on the received ULI. However, because they are not trusted access networks, the untrusted access networks lack this Ta signaling interface.

The advantages of enabling 5GC to identify the type of untrusted non-3GPP access network used by a UE that connects to 5GC via an N3IWF include the following:

The operators can exercise better access control. For example, they may allow access to 5GC only from certain types of untrusted non-3GPP accesses, while disallow access to 5GC from other types of untrusted non-3GPP accesses.

The operators can better control access to certain services. For example, they may allow access to IMS services from untrusted WLAN accesses but not from wireline accesses.

The operators can better control the QoS over different types of untrusted non-3GPP access. For example, they may assign different QoS parameters to a Service Data Flow (SDF) depending on the type of untrusted non-3GPP that carries this SDF.

They operators can exercise better charging control. For example, they may choose to apply different charging policies when the UE uses untrusted WLAN access over the charging policies applied when the UE uses SNPN access.

To overcome the above drawbacks, this disclosure describes alternative procedures for the UE to connect to the 5G core in the PLMN after obtaining IP connectivity via the SNPN. As described in greater detail below, the UE may connect with a TNGF (Trusted Non-3GPP Gateway Function) in the PLMN, instead of an N3IWF. Accordingly, new and different procedures are required for the UE to connect to the PLMN using the TNGF.

FIG. 1 depicts a wireless communication system 100 for determining a RAT for an untrusted access network, according to embodiments of the disclosure. In one embodiment, the wireless communication system 100 includes at least one remote unit 105, at least one base unit 110, at least one untrusted non-3GPP access network ("untrusted AN") 120, and a mobile core network 140 in a PLMN. The untrusted AN 120 may be composed of at least one base unit 110. The remote unit 105 may communicate with the untrusted AN 120 using 3GPP communication links and/or non-3GPP communication links 113, according to a radio access technology deployed by untrusted AN 120. Even though a specific number of remote units 105, base units 110, untrusted ANs 120, and mobile core networks 140 are depicted in FIG. 1, one of skill in the art will recognize that any number of remote units 105, base units 110, untrusted ANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the untrusted AN 120 via uplink ("UL") and downlink ("DL") communication signals. Furthermore, the UL and DL communication signals may be carried over the communication links 113. Note, that the untrusted AN 120 is an intermediate network that provide the remote units 105 with access to the mobile core network 140, e.g., via the IP network 150.

In some embodiments, the remote units 105 communicate with an application server (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the untrusted AN 120. The mobile core network 140 then relays traffic between the remote unit 105 and, e.g., an application server in the IP network 150 using the PDU session. Note that the remote unit 105 may establish one or more PDU sessions (or other data connections) with the mobile core network 140. As such, the remote unit 105 may have at least one PDU session for communicating with the IP network 150. The remote unit 105 may establish additional PDU sessions for communicating with other data network and/or other communication peers.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the untrusted AN 120, that may include one or more controllers communicably coupled to one or more corresponding base units 110. These and other elements of radio access network are not illustrated but are well known generally by those having ordinary skill in the art. The base units 110 connect to the mobile core network 140 via the untrusted AN 120.

The base units 110 may serve a number of remote units 105 within a serving area, for example, a cell or a cell sector, via a communication link 113. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 110.

In one embodiment, the mobile core network 140 is a 5G core ("5GC") or the evolved packet core ("EPC"), which may be coupled to a data network (e.g., the IP network 150, such as the Internet and private data networks, among other data networks). A remote unit 105 may have a subscription or other account with the mobile core network 140. The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least one UPF 141 that serves the untrusted AN 120. The mobile core network 140 also includes multiple control plane functions including, but not limited to, an Access and Mobility Management Function ("AMF") 143, a Session Management Function ("SMF") 145, and Policy Control Function ("PCF") 147. In certain embodiments, the mobile core network 140 may also include a Unified Data Management function ("UDM"), an Authentication Server Function ("AUSF"), a Network Repository Function ("NRF") (used by the various NFs to discover and communicate with each other over APIs), or other NFs defined for the 5G Core.

The N3IWF 153 is a network function that supports access to a 5GC via untrusted non-3GPP access networks. In certain embodiments, the N3IWF 153 supports connectivity to one or more 5GC networks for UEs which do support the NAS protocol over non-3GPP access and the applicable NAS procedures.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM. In another example, each network slice includes an AMF, an SMF and a UPF. Although specific numbers and types of network functions are depicted in FIG.

1, one of skill in the art will recognize that any number to and type of network functions may be included in the mobile core network 140.

To enable the mobile core network 140 (e.g., a 5GC) to identify the type of untrusted non-3GPP access network used by a remote unit 105 that connects to the mobile core network 140 via an N3IWF 153, the remote unit 105 acquires access network information which is sent to the AMF 143 via the N3IWF 153. Using the access network information, the AMF 143 determines a radio access type ("RAT") for the untrusted AN 120.

Figure 2C:
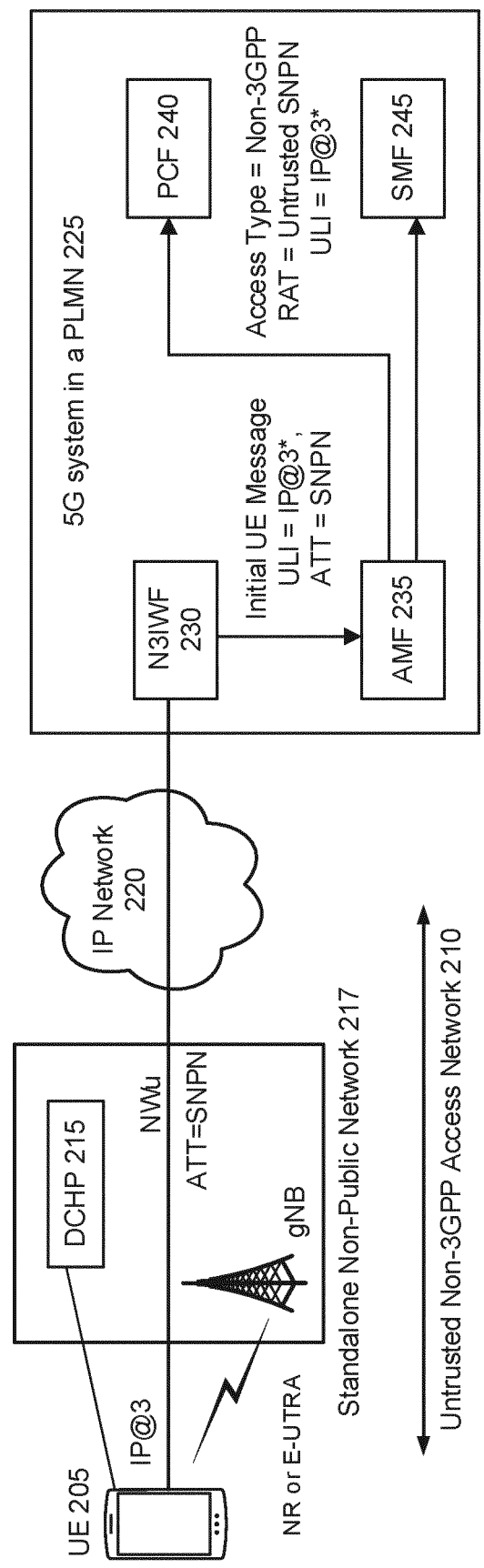
FIG. 2C is a diagram illustrating a third embodiment of a network deployment for determining a RAT for an untrusted access network.

FIGS. 2A-2C depict network deployment variant comprising a UE 205 which registers with a 5G system in a PLMN 225 via an untrusted non-3GPP access network 210 and IP network 220. In various embodiments, the untrusted non-3GPP access networks 210 include a DCHP server 215.

As depicted, the 5G system in a PLMN 225 includes at least a N3IWF 230, an AMF 235, a PCF 240, and an SMF 245. The 5G system in a PLMN 225 may be one embodiment of the mobile core network 140. In various embodiments, the N3IWF 230, AMF 235, PCF 240, and SMF 245 are embodiments of the N3IWF 153, the AMF 143, the PCF 147, and the SMF 145, respectively. Note that there is not a connection (e.g., Ta interface) directly between the untrusted non-3GPP access network 210 and the 5G core. For this reason, the UE 205 and/or N3IWF 230 provide the AMF 235 with access network information so that the AMF 235 can determine a RAT for the untrusted non-3GPP access network 210.

FIG. 2A depicts a first network deployment 200 where the untrusted non-3GPP access network 210 comprises a Wi-Fi access network 211, e.g. a public hotspot or a residential Wi-Fi network. As depicted, the UE 205 communicates with the Wi-Fi access point ("AP") using the IEEE 802.11 standards for radio communications.

The UE 205 connects to the Wi-Fi access network 211 and obtains information about this access network including the Access Technology Type (ATT) and the Access Network Identity (ANI). In one embodiment, this information is obtained from the DHCP server 215. In another embodiment, this information is obtained from the data broadcast by the Wi-Fi access network 211. As an example, when the UE 205 connects to the Wi-Fi access network 211, the ATT indicates "WLAN" or "IEEE 802.11" and the ANI indicates the SSID of the WLAN.

The UE 205 establishes an NWu connection with the N3IWF 230 and sends the obtained ATT to the N3IWF 230, which forwards the ATT to the AMF 235 inside the Initial UE Message. Note that the Initial UE Message is associated with the IP address IP@1 (ULI). In addition, the UE 205 may also forward the ANI to N3IWF 230. The AMF 235 determines the particular Radio Access Type ("RAT") of the untrusted non-3GPP access network used by the UE 205. Instead of the general RAT=Virtual that is currently used for all types of untrusted non-3GPP access, the AMF 235 may determine that RAT=Untrusted-WLAN.

FIG. 2B depicts a second network deployment 250 where the untrusted non-3GPP access network 210 comprises a Wireline Access Network 213, e.g. a cable or ADSL access network. As depicted, the UE 205 communicates with the residential gateway ("RG") using IEEE 802.11, NR, E-UTRA, or Ethernet standards.

The UE 205 connects to the Wireline Access Network 213 and obtains information about this access network including the Access Technology Type (ATT) and the Access Network Identity (ANI). In one embodiment, this information is obtained from the DHCP server 215. In another embodiment, this information is obtained from the data broadcast by the Wireline Access Network 213. As an example, when the UE 205 connects to the Wireline Access Network 213, the ATT indicates "Wireline" and the ANI indicates the Global Line Identity (GLI) or the Global Cable Identity (GCI) of the fixed line where the UE 205 is connected to.

The UE 205 establishes an NWu connection with the N3IWF 230 and sends the obtained ATT to the N3IWF 230, which forwards the ATT to the AMF 235 inside the Initial UE Message. Note that the Initial UE Message is associated with the IP address IP@2 (ULI). In addition, the UE 205 may also forward the ANI to N3IWF 230. The AMF 235 determines the particular Radio Access Type ("RAT") of the untrusted non-3GPP access network used by the UE 205. Instead of the general RAT=Virtual that is currently used for all types of untrusted non-3GPP access, the AMF 235 may determine that RAT=Untrusted-Wireline.

FIG. 2C depicts a third network deployment 260 where the untrusted non-3GPP access network 210 comprises a Standalone Non-Public Network (SNPN) 217, e.g. a private 5G network providing mobile services to a specific organization and deployed on the organization's premises, such as a campus, an enterprise or a factory. As depicted, the UE 205 communicates with the private gNB using the NR and/or E-UTRA standards for radio communications.

The UE 205 connects to the SNPN 217 and obtains information about this access network including the Access Technology Type (ATT) and the Access Network Identity (ANI). In one embodiment, this information is obtained from the DHCP server 215. In another embodiment, this information is obtained from the data broadcast by the SNPN 217. As an example, when the UE 205 connects to the SNPN 217, the ATT indicates "SNPN".

The UE 205 establishes an NWu connection with the N3IWF 230 and sends the obtained ATT to the N3IWF 230, which forwards the ATT to the AMF 235 inside the Initial UE Message. Note that the Initial UE Message is associated with the IP address IP@3 (ULI). In addition, the UE 205 may also forward the ANI to N3IWF 230. The AMF 235 determines the particular Radio Access Type ("RAT") of the untrusted non-3GPP access network used by the UE 205. Instead of the general RAT=Virtual that is currently used for all types of untrusted non-3GPP access, the AMF 235 may determine that RAT=Untrusted-SNPN.

As discussed above, after determining the RAT for the untrusted non-3GPP access network 210, the AMF 235 sends the RAT is then sent to other network functions in the 5G core, such as the PCF 240 and SMF 245, which take it into account for performing their operations, e.g. for creating charging or QoS policies for the UE, for deciding if access to a certain Data Network (DN) is allowed, etc.

Note that the ULI contains the IP address of the UE 205 as known by the N3IWF 230. This address may be the same as the IP address assigned to UE 205 by the untrusted non-3GPP access network 210 or may be a different address when a Source Network Address Translation (SNAT) device exists between the UE 205 and the N3IWF 230, which is a very common case. For this reason, the address IP@1*, IP@2*, IP@3* sent by the N3IWF 230 to AMF 235 may be the same or different from the IP@1, IP@2, IP@3 (respectively) assigned to UE 205. In general, the ULI cannot be used by the AMF 235 to determine the type of untrusted non-3GPP access being used by the UE 205.

Further note that the solution in the present disclosure can also be applied to the scenario of a UE accessing an Evolved Packet Core (EPC) over an untrusted non-3GPP access network and can enable the ePDG to determine the Access Technology Type (or RAT) that is used by the UE to access EPC via an untrusted non-3GPP access network.

Figure 3A:
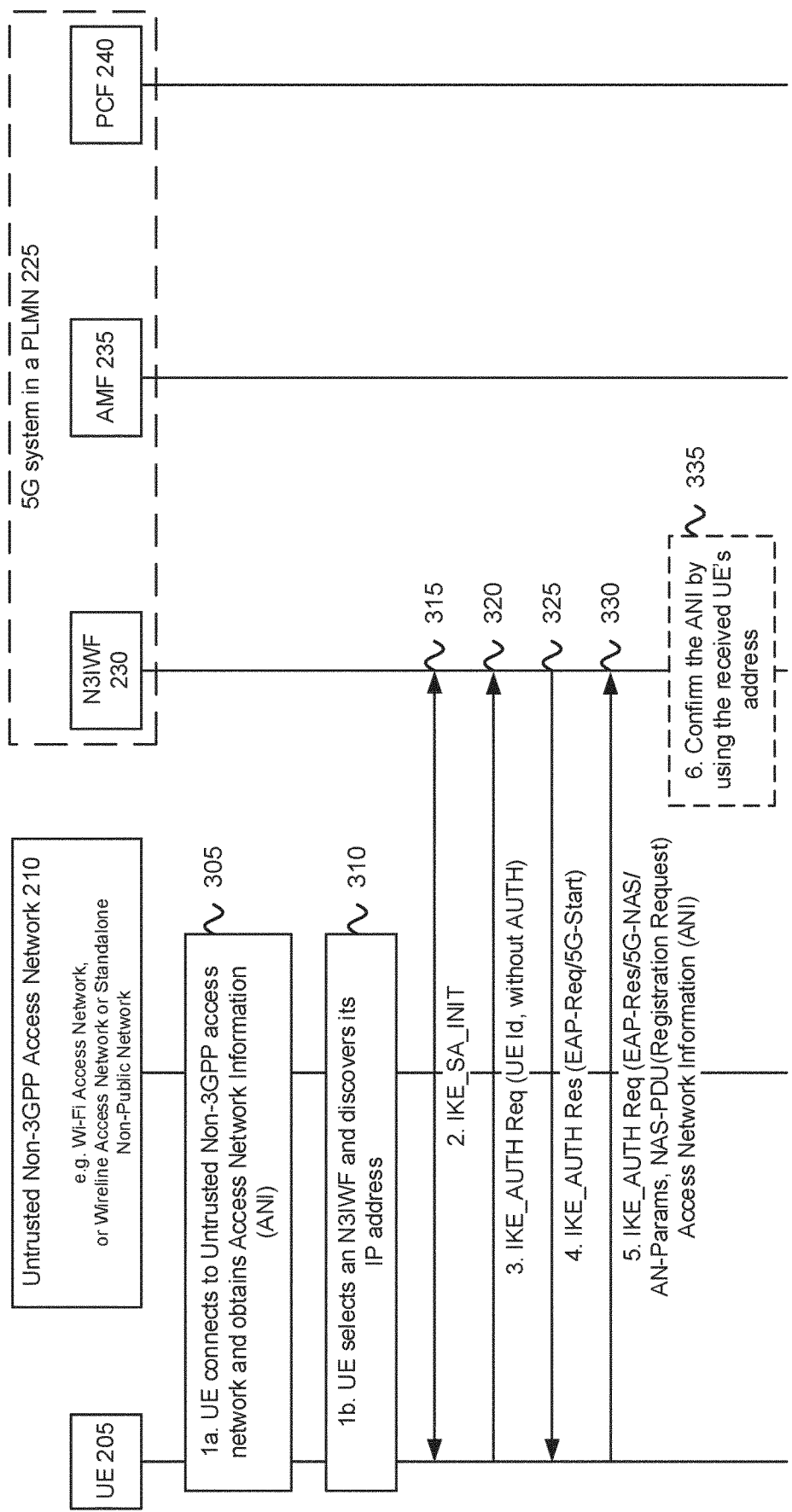
FIG. 3A is a signal flow diagram illustrating one embodiment of a procedure for registering with a PLMN through a non-public mobile network.
Figure 3B:
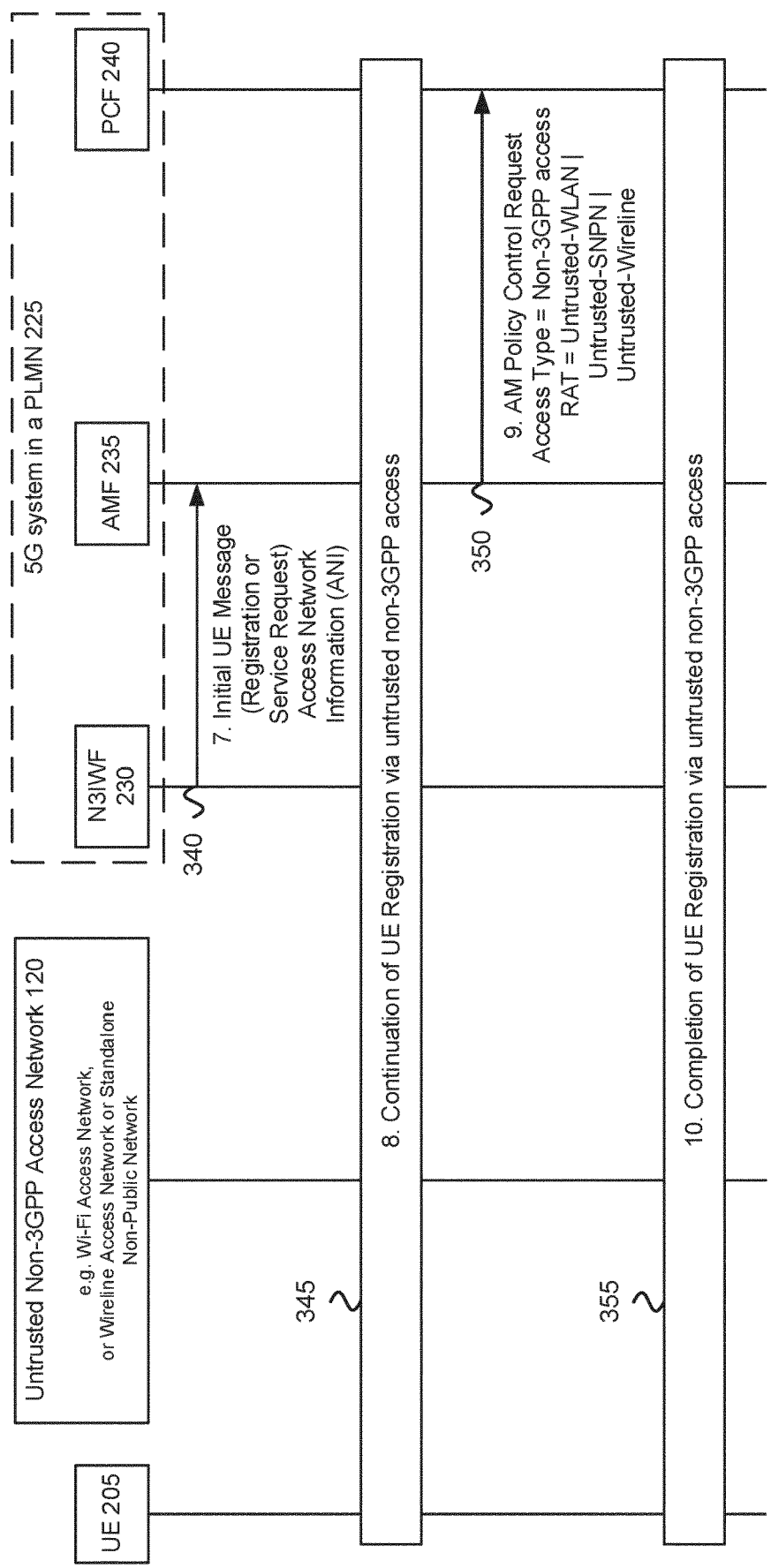
FIG. 3B is a continuation of the procedure depicted in FIG. 3A.

FIGS. 3A-3B depict a procedure 300 for determining a RAT for an untrusted access network, according to embodiments of the disclosure. The procedure 300 involves the UE 205 (e.g., one embodiment of the remote unit 105), an untrusted non-3GPP access network 210, and an N3IWF 230, an AMF 235, and a PCF 240 in the 5G system in a PLMN 225. The procedure 300 details signaling flow for a scenario where a UE attempts to register with a 5G system in a PLMN 225 via an untrusted non-3GPP access network. Similar steps take place in other scenarios, e.g. when the UE attempts to perform a Service Request, instead of a Registration Request. In some embodiments, the N3IWF 230 is part of the 5G core. In other embodiments, the N3IWF is part of the access network.

Referring to FIG. 3A, the procedure 300 begins at Step 1a where the UE 205 connects to an access network, such as a Wi-Fi access network 211, or a wireline access network 213, or an SNPN 217, and obtains Access Network Information (ANI) about this access network (see block 305). The Access Network Information includes an Access Technology Type (ATT) parameter and may include additional parameters, such as an Access Network Identifier (ANId), and an Access Operator Identifier (AOI).

In certain embodiments, the parameters in the ANI are determined by using the DHCP protocol: In the DHCP Request (either DHCPv4 or DHCPv6), the UE 205 requests to receive the Access-Network-Identifier (as specified in RFC 7839), which contains information related to the identity of the access network to which the UE 205 is attached. This information can include an access technology type, a network identifier, and access network operator identifiers. The UE 205 determines the ANI parameters by using the Access-Network-Identifier information received in the DHCP Response. Specifically, the ATT parameter is determined based on the access technology type in the received Access-Network-Identifier information, the ANId parameter is determined based on the access identifier in the received Access-Network-Identifier information, and the AOI parameter is determined based on the network operator identifiers in the received Access-Network-Identifier information.

In certain embodiments, the parameters in the ANI are determined by using the ANQP protocol: When the UE 205 uses IEEE 802.11 radio technology on the access link, the UE 205 may use the Access Network Query Protocol (ANQP), specified in IEEE 802.11 specification, to request information about the access network. Parameters advertised with the ANQP protocol are specified in IEEE 802.11 specification and in the Wi-Fi-Alliance Hotspot 2.0 specification. Such parameters (called ANQP elements) include a Domain Name, which can be used by the UE 205 to determine the ANId, and an Operator Friendly Name, which can be used by the UE 205 to determine the AOI. Although no ANQP parameter is currently specified to indicate the access technology type of the access network, this parameter can be defined as a new vendor-specific ANQP parameter. The UE 205 can use this new ANQP parameter to determine the ATT.

In certain embodiments, the parameters in the ANI are determined by receiving broadcast data: When the UE 205 connects to an SNPN, the UE 205 knows the access technology type (i.e. "SNPN") of the SNPN, knows the network identity of the SNPN (i.e. the PLMN ID+Network Access Identity broadcast by the SNPN), and the operator associated with the SNPN (as determined from the MCC and MNC values of the PLMN ID). The UE 205 can use this information to determine the ATT parameter and the ANId and AOI parameters. When the UE 205 connects to an access network by using IEEE 802.11 radio technology, the UE 205 can determine the SSID broadcast by the access network, and this SSID can be used to determine the ANId parameter.

At Step 1b, after connecting to the access network 210 and obtaining ANI, the UE 205 decides to register with the 5G core in a PLMN 225 via the access network 210 by using an "untrusted non-3GPP access" registration procedure, e.g., specified in TS 23.502, clause 4.12.2. In certain embodiments, the procedure shown in Fig. 3.3-1 extends the procedure in TS 23.502, clause 4.12.2. Before initiating the "untrusted non-3GPP access" registration procedure, the UE 205 selects an N3IWF 230 by using the procedures specified in TS 23.501 and discovers the IP address of this N3IWF 230 by using DNS procedures (see block 310).

At Step 2, the UE 205 proceeds with the establishment of an IPsec Security Association (SA) with the selected N3IWF by initiating an IKE initial exchange according to RFC 7296 (see messaging 315). After step 2, all subsequent IKE messages are encrypted and integrity protected by using the IKE SA established in this step.

At step 3, the UE 205 initiates an IKE_AUTH exchange by sending an IKE_AUTH request message (see messaging 320). The AUTH payload is not included in the IKE_AUTH request message, which indicates that the IKE_AUTH exchange shall use EAP signaling.

At step 4, the N3IWF 230 responds with an IKE_AUTH response message, which includes an EAP-Request/5G-Start packet (see messaging 325). The EAP-Request/5G-Start packet informs the UE 205 to initiate an EAP-5G session, i.e. to start sending NAS messages encapsulated within EAP-5G packets.

At step 5, the UE 205 sends an IKE_AUTH request, which includes an EAP-Response/5G-NAS packet that contains the Access Network parameters (AN-params) and a Registration Request message. The AN-params contain information that is used by the N3IWF 230 for selecting an AMF 235 in the 5G core network, including e.g. the GUAMI, the Selected PLMN ID, the Requested NSSAI and the Establishment cause. The Establishment cause provides the reason for requesting a signaling connection with 5GC.

In message 330, the UE 205 includes also the ANI that contains the ATT parameter and, optionally, the ANId and AOI parameters, which were determined by the UE 205 in step 1. The ANI can be included either in the EAP-Res/5G-NAS message, e.g., as an additional parameter in AN-Params, or can be included in the IKE_AUTH Request message as a new vendor-specific IKE attribute.

At step 6, the N3IWF 230 may optionally attempt to perform a rough validation of the ANI information provided by the UE 205, e.g., to confirm that the AOI provided by the UE 205 is correct. For this purpose, the N3IWF 230 may be configured with a table that contains the IP addresses allocated to several access network operators, e.g., "IP address space=16.3.0.0/16⇒AOI='WLAN-Operator-A';" "IP address space=191.23.4.0/8⇒AOI='Car-Vendor-B';" and "IP address space=2001:db8:3c4d:15::/64⇒AOI='Cable-Operator-C'."

When the N3IWF 230 receives a request to establish an IPsec Security Association (SA) from IPv4 address 16.3.1.1 and the AOI in step 5 is different from "WLAN-Operator-A", then the N3IWF 230 considers the ANI as invalid. Similarly, when the N3IWF 230 receives a request to establish an IPsec SA from IPv6 address 2001:db8:3c4d:15:

a23d:45:1:1 and the AOI in step 5 is different from "Cable-Operator-C", then the N3IWF 230 considers the ANI as invalid.

Continuing on FIG. 3B, at step 7, the N3IWF 230 selects an AMF 235 based on the received AN-Params and local policy, as specified in TS 23.501, clause 6.3.5, and forwards the Registration Request received from the UE 205 to the selected AMF 235 within an Initial UE message (see messaging 335). This message is extended (e.g., with a new information element) to include also the ANI received from the UE 205.

From the received ANI, the AMF 235 determines the Radio Access Type (RAT) of the untrusted non-3GPP access used by the UE 205 (see block 340). In particular: if the ATT parameter in ANI indicates "WLAN", the AMF 235 sets RAT="Untrusted-WLAN"; if the ATT parameter in ANI indicates "Wireline", the AMF 235 sets RAT="Untrusted-Wireline"; if the ATT parameter in ANI indicates "SNPN", the AMF 235 sets RAT="Untrusted-SNPN".

An additional parameter called "ANI-Validate" may be included in message 7 (not shown in FIG. 3B) which indicates if the N3IWF managed to validate the ANI provided by the UE 205. The AMF 235 may be configured to set RAT="Virtual" when the ANI is not validated by the N3IWF, e.g. because the AMF 235 does not trust the parameters provided by the UE 205 and wants to avoid misuse of these parameters. Alternatively, the AMF 235 may be configured to trust the ANI parameters provided by all or some UEs 205, even if the ANI is not validated by the N3IWF 230, and to set the RAT value as defined above.

At step 8, additional steps of the normal registration procedure specified in TS 23.502 clause 4.12.2 are executed (see block 345).

At step 9, the AMF 235 sends an AM Policy Control Request to PCF in order to receive Access Management (AM) policy for the UE 205 (see messaging 350). Note that the RAT type provided to PCF 240 is set according to the RAT type derived by AMF 235 in step 7. This enables the PCF 240 to derive AM policy based on the particular type of the untrusted non-3GPP access 210 used by the UE 205.

When the UE 205 requests a PDU Session (not shown in FIG. 3B), the AMF 235 also provides the RAT type to SMF 245 and the SMF 245 forwards the RAT type to the PCF 240 when requesting Session Management (SM) policies. This enables the PCF 240 to derive SM policy based on the particular type of the untrusted non-3GPP access 210 used by the UE 205. Note that the SMF 245 derives a session management context for the PDU session that includes the session management policy received from the PCF 240.

At step 10, the registration procedure to the 5G core is completed, e.g., with the additional steps specified in TS 23.502 clause 4.12.2 (see block 355).

The above procedure focuses on the ATT parameter and illustrates how this parameter is used by AMF to derive the RAT type for the untrusted non-3GPP access. Note that, as discussed in step 6, the AOI may be used for validating the ANI provided by the UE 205. In general, the ANId and AOI can also be provided from AMF 235 to PCF 240 and SMF 245 and can be used for deriving policies based on the identity of the access network and/or based on the operator of the access network. For example, a 5G core may be configured to reject UEs 205 that attempt to register from a wireline access of Operator-A, but to allow UEs 205 that attempt to register from a wireline access of Operator-B.

In an alternative embodiment, the UE 205 does not need to obtain the ANI as specified in step 1 of the procedure 300 and does not need to provide the ANI to the N3IWF 230. However, the N3IWF 230 is configured with ANI-mapping table that can be used to derive the ANI based on the source IP address with which the IPsec SA is established.

This source IP address can be the UE's IP address, if the UE 205 is assigned a public IP address, or a different IP address, if the UE 205 is assigned a private IP address. In FIGS. 2A-2C this source IP address is shown as IP@1*, IP@2* and IP@3*.

Table 1 is an example of an ANI-mapping table with 3 lines:

TABLE 1

| IP address space | ATT | ANId | AOI |
|---|---|---|---|
| 16.3.0.0/16 | WLAN | Airport-hotspot | WLAN-Operator-A |
| 191.23.4.0/8 | SNPN | MCC + MNC + NID | Car-Vendor-B |
| 2001:db8:3c4d:15::/64 | Wireline | none | Cable-Operator-C |

Based on the above ANI-mapping table, when the N3IWF 230 receives a request to establish an IPsec SA from the source IPv4 address 16.3.1.1, then it determines the ANI from the first line of the table. Similarly, when the N3IWF 230 receives a request to establish an IPsec SA from the source IPv6 address 2001:db8:3c4d:15:a23d:45:1:1, then it determines the ANI from the third line of the table.

In the alternative embodiment, the N3IWF 230 provides the determined ANI to AMF 235 in the messaging 340 of FIG. 3B (i.e., step 7) and the AMF 235 derives the RAT type as discussed above.

Figure 4:
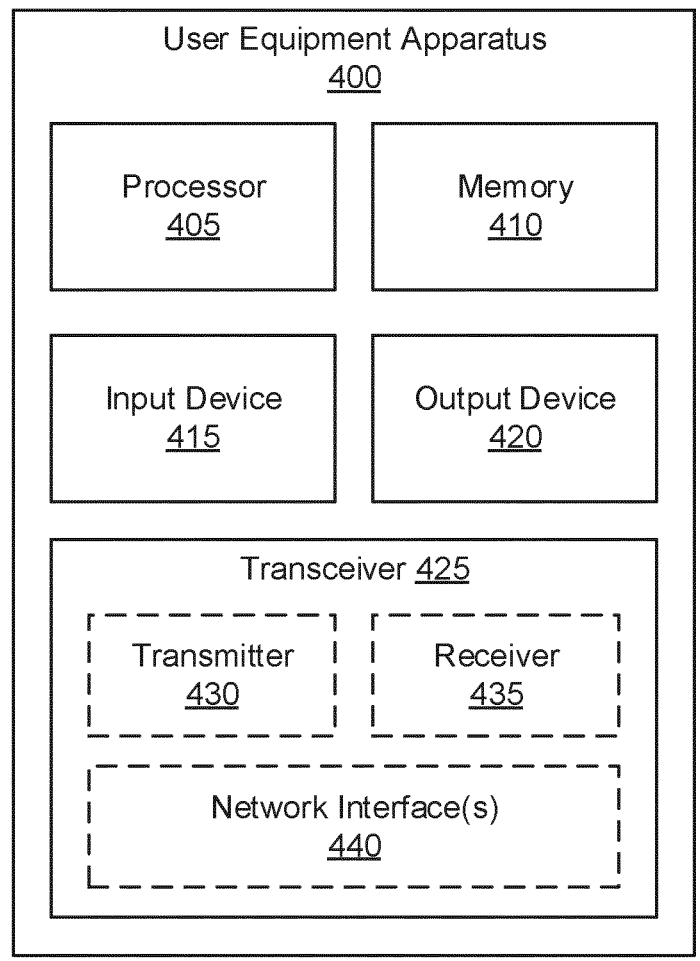
FIG. 4 is a block diagram illustrating one embodiment of a user equipment apparatus for determining a RAT for an untrusted access network.

FIG. 4 depicts one embodiment of a user equipment apparatus 400 that may be used for determining a RAT for an untrusted access network, according to embodiments of the disclosure. The user equipment apparatus 400 may be one embodiment of the remote unit 105 and/or the UE 205. Furthermore, the user equipment apparatus 400 may include a processor 405, a memory 410, an input device 415, an output device 420, a transceiver 425. In some embodiments, the input device 415 and the output device 420 are combined into a single device, such as a touch screen. In certain embodiments, the user equipment apparatus 400 does not include any input device 415 and/or output device 420.

As depicted, the transceiver 425 includes at least one transmitter 430 and at least one receiver 435. Here, the transceiver 425 communicates with a mobile core network (e.g., a 5GC) via an access network. Additionally, the transceiver 425 may support at least one network interface 440. Here, the at least one network interface 440 facilitates communication with an eNB or gNB (e.g., using the "Uu" interface). Additionally, the at least one network interface 440 may include an interface used for communications with an AMF, an SMF, and/or a UPF.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 obtains ANI about the first access network, the ANI including an access technology type for the first access network. The processor 405 determines to register with a mobile communication network (e.g., a 5GC) via the first access network using an untrusted registration procedure and sends a first request (e.g., an IKE_AUTH Request) to establish a secure connection with a N3IWF in the mobile communication network. Here, the first request includes a registration request for the mobile communication network and the obtained ANI, wherein the obtained ANI is used by the mobile communication network to determine a RAT for the first access network. In other embodiments, the first request includes a service request, instead of the registration request. In such embodiments, the first request also includes the obtained ANI.

Via the transceiver 425, the processor 405 receives a response to the registration request (or service request) after establishing the secure connection with the N3IWF, wherein the response depends on the RAT. For example, based on the RAT, the network may accept or refuse the registration request (or service request). As another example, policies may be derived based on the RAT.

In some embodiments, the processor 405 establishes a data connection (e.g., PDU Session) with the mobile communication network via the first access network. In such embodiments, the data connection may be configured to operate based on the RAT. For example, based on the RAT the data connection may be refused or may be accepted. As another example, the data connection may operate under QoS and charging policy that depends on the RAT.

In some embodiments, obtaining the ANI includes querying a server in the first access network, the server including one of: a DHCP server and an ANQP server. In further embodiments, obtaining the ANI includes transmitting a DHCP Request and receiving a DHCP Ack containing an Access-Network-Identifier option (e.g., as defined in RFC 5839). In such embodiments, the ANI is derived based on parameters included in the Access-Network-Identifier option. In certain embodiments, the parameters in the Access-Network-Identifier option include an access technology type, an access network identifier, and an operator identifier.

In some embodiments, obtaining the ANI includes receiving broadcast data from the first access network and deriving the ANI based on parameters in the broadcast data. In some embodiments, the obtained ANI in the first request is validated by the N3IWF, wherein the obtained ANI is used by the mobile communication network to determine a RAT for the first access network only if the obtained ANI is successfully validated.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to determining a RAT for an untrusted access network, for example storing ANI, IP addresses, and the like. In certain embodiments, the memory 410 also stores program code and related data, such as an operating system ("OS") or other controller algorithms operating on the user equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
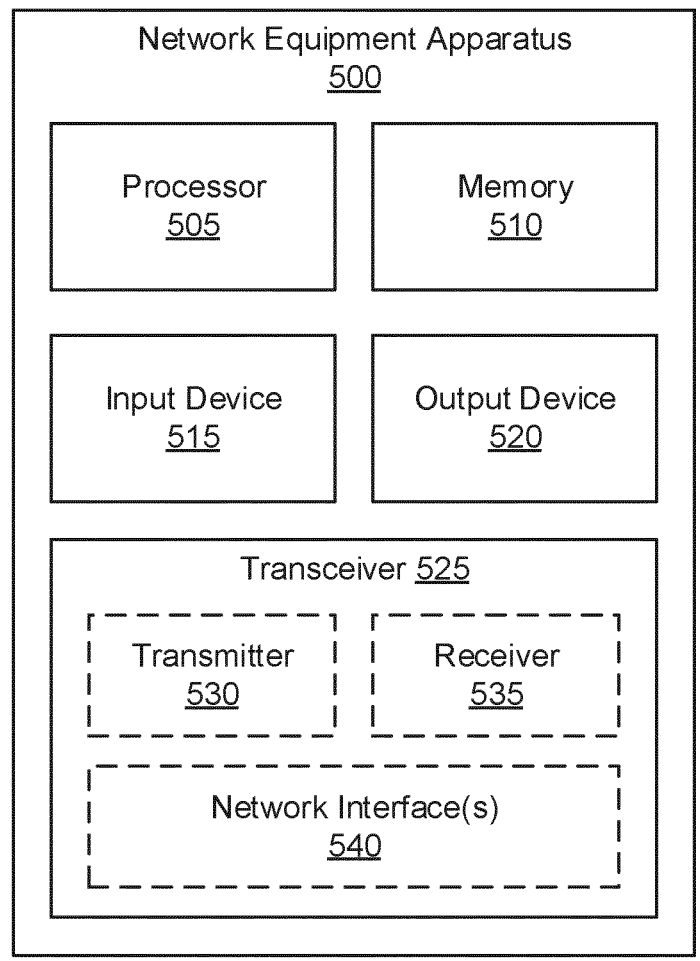
FIG. 5 is a block diagram illustrating one embodiment of a network equipment apparatus for determining a RAT for an untrusted access network.

FIG. 5 depicts one embodiment of a network equipment apparatus 500 that may be used for determining a RAT for an untrusted access network, according to embodiments of the disclosure. In some embodiments, the network equipment apparatus 500 may be one embodiment of a 5G-RG. Furthermore, network equipment apparatus 500 may include a processor 505, a memory 510, an input device 515, an output device 520, a transceiver 525. In some embodiments, the input device 515 and the output device 520 are combined into a single device, such as a touch screen. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105. Additionally, the transceiver 525 may support at least one network interface 540, such as the NWu interface depicted in FIG. 1. In some embodiments, the transceiver 525 supports a first interface for communicating with a RAN node, a second interface for communicating with one or more network functions in a mobile core network (e.g., a 5GC) and a third interface for communicating with a remote unit (e.g., UE).

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the network equipment apparatus 500 operates as a N3IWF. In such embodiments, the transceiver 525 supports a first network interface that communicates with a remote unit via a first access network and a second network interface that communicates with an AMF in a mobile core network.

In some embodiments, the processor 505 receives a first request (e.g., an IKE_AUTH Request) from the remote unit to establish a secure connection. Here, the first request includes a registration request for the mobile communication network, a first source address and ANI about the first access network. The processor 505 validates the ANI using the first source address and the ANI and sends a first message to the AMF including the registration request and the ANI, where the ANI is used by the AMF to determine a RAT for the first access network, and where the mobile communication network processes the registration request based on the determined RAT. In certain embodiments, the first request includes a service request in place of the registration request.

In some embodiments, the ANI includes an operator identifier. In such embodiments, validating the ANI includes comparing the first source address with a pre-configured address space selected using the operator identifier, wherein the ANI is successfully validated in response to the first source address belonging to the pre-configured address space. In some embodiments, the first message to the AMF includes an indication of whether the ANI was successfully validated, wherein the AMF further determines the RAT based on whether the ANI was successfully validated. In certain embodiments, the first source address is the source IP address of the packet that contains the first request (e.g., IKE_AUTH Request). Note that first source address will not be the IP address of the UE if a Network Address Translator exists in the data path.

In some embodiments, the processor 505 receives a first request (e.g., an IKE_AUTH Request) from a remote unit to establish a secure connection. Here, the first request includes a registration request for the mobile communication network and a first source address. The processor 505 obtains ANI about the first access network including an access technology type for the first access network using the first source address and sends a first message to the AMF including the registration request and the obtained ANI, wherein the obtained ANI is used by the AMF to determine a RAT for the first access network, and wherein the mobile communication network processes the registration request based on the determined RAT. In certain embodiments, the first request includes a service request in place of the registration request and the network processes the service request based on the determined RAT.

In some embodiments, obtaining the ANI includes using a pre-configured table that contains the ANI for a first address space, wherein the first source address belongs to the first address space.

In various embodiments, the network equipment apparatus 500 operates as an AMF. In such embodiments, the transceiver 525 supports a first network interface that communicates with a N3IWF in a mobile communication network and a processor 505 that receives a first message via the N3IWF including a registration request for a remote unit connected to N3IWF via a first access network. Here, the first message also includes ANI about the first access network. The processor 505 determines a RAT for the first access network using the ANI and determines whether to accept the registration request based on the determined RAT. Via the first network interface, the processor 505 sends to the remote unit a response to the registration request.

In some embodiments, receiving the first message includes receiving an indication from the N3IWF of whether the ANI was successfully validated. In such embodiments, determining the RAT is further based on whether the ANI was successfully validated. In some embodiments, the processor 505 further sends a policy request to a policy control function via a second network interface, the policy request including the RAT, wherein the policy control function derives an access management policy for the remote unit based on the RAT.

In some embodiments, the processor 505 further receives via the N3IWF a request to establish a data connection (e.g., a PDU session) for the remote unit and sends a session context create request to a session management function via a second network interface. In such embodiments, the session context create request including the RAT, wherein the session management function derives a session context create including session management policy for the remote unit based on the RAT. The session management policy for the session context is retrieved by the session management policy from a policy control function.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to determining a RAT for an untrusted access network, for example storing ANI, IP addresses, UE contexts, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
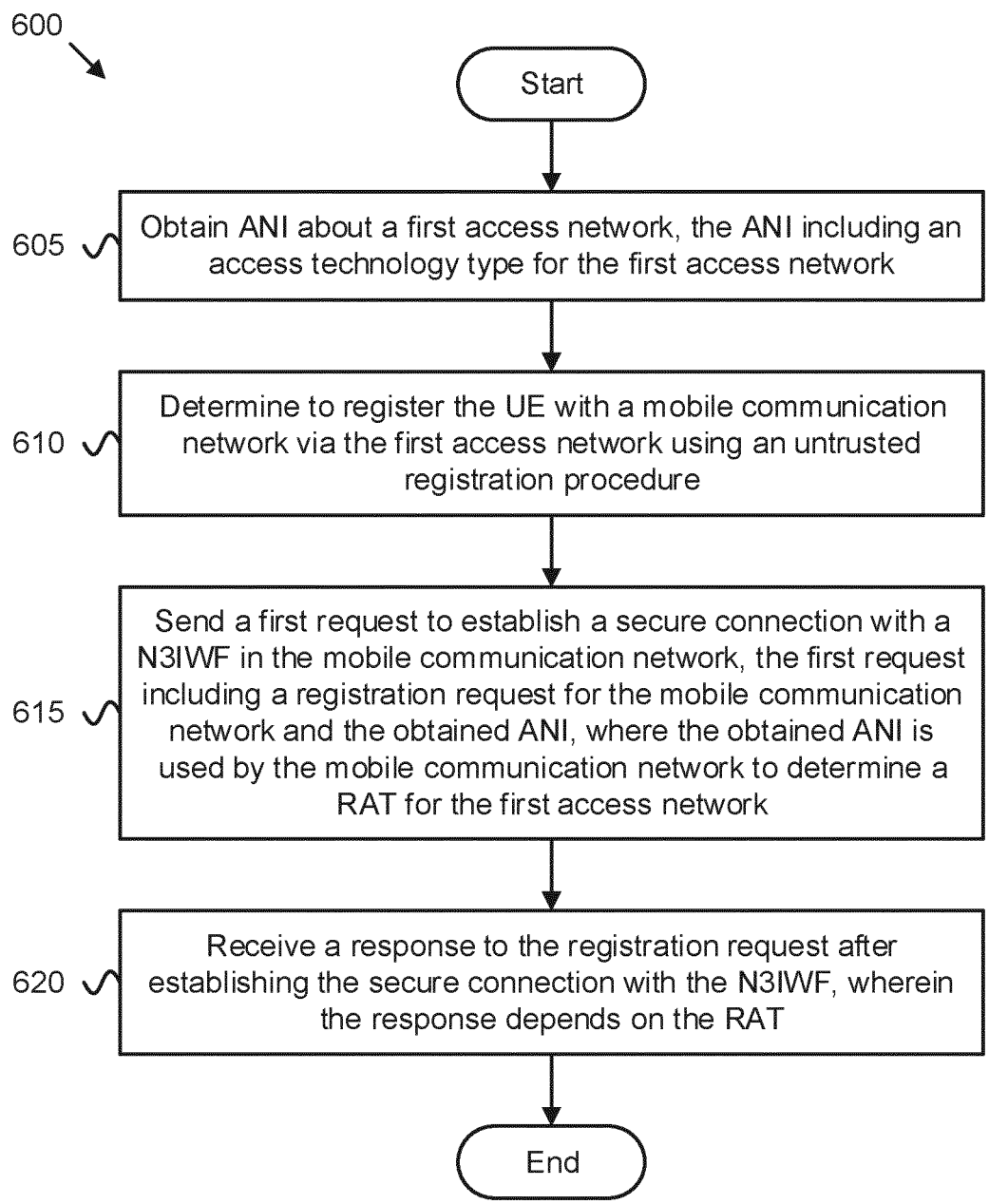
FIG. 6 is a flow chart diagram illustrating one embodiment of a first method for determining a RAT for an untrusted access network.

FIG. 6 depicts a method 600 for determining a RAT for an untrusted access network, according to embodiments of the disclosure. In some embodiments, the method 600 is performed by a UE, such as the remote unit 105, the UE 205 and/or the user equipment apparatus 400. In certain embodiments, the method 600 may be performed by a processor executing program code, for example, a microcontroller, a microprocessor, a CPU, a GPU, an auxiliary processing unit, a FPGA, or the like.

The method 600 begins and obtains 605 ANI about a first access network, the ANI including an access technology type for the first access network. The method 600 includes determining 610 to register with a mobile communication network (e.g., 5GC) via the first access network using an untrusted registration procedure. The method 600 includes sending 615 a first request (e.g., an IKE_AUTH Request) to establish a secure connection with a N3IWF in the mobile communication network. Here, the first request includes a registration request for the mobile communication network and the obtained ANI, wherein the obtained ANI is used by the mobile communication network to determine a RAT for the first access network. The method 600 includes receiving 620 a response to the registration request after establishing the secure connection with the N3IWF, wherein the response depends on the RAT. For example, based on the RAT, the registration request may be accepted or refused. As another example, the network may derive policies for the UE registration based on the RAT. The method 600 ends.

Figure 7:
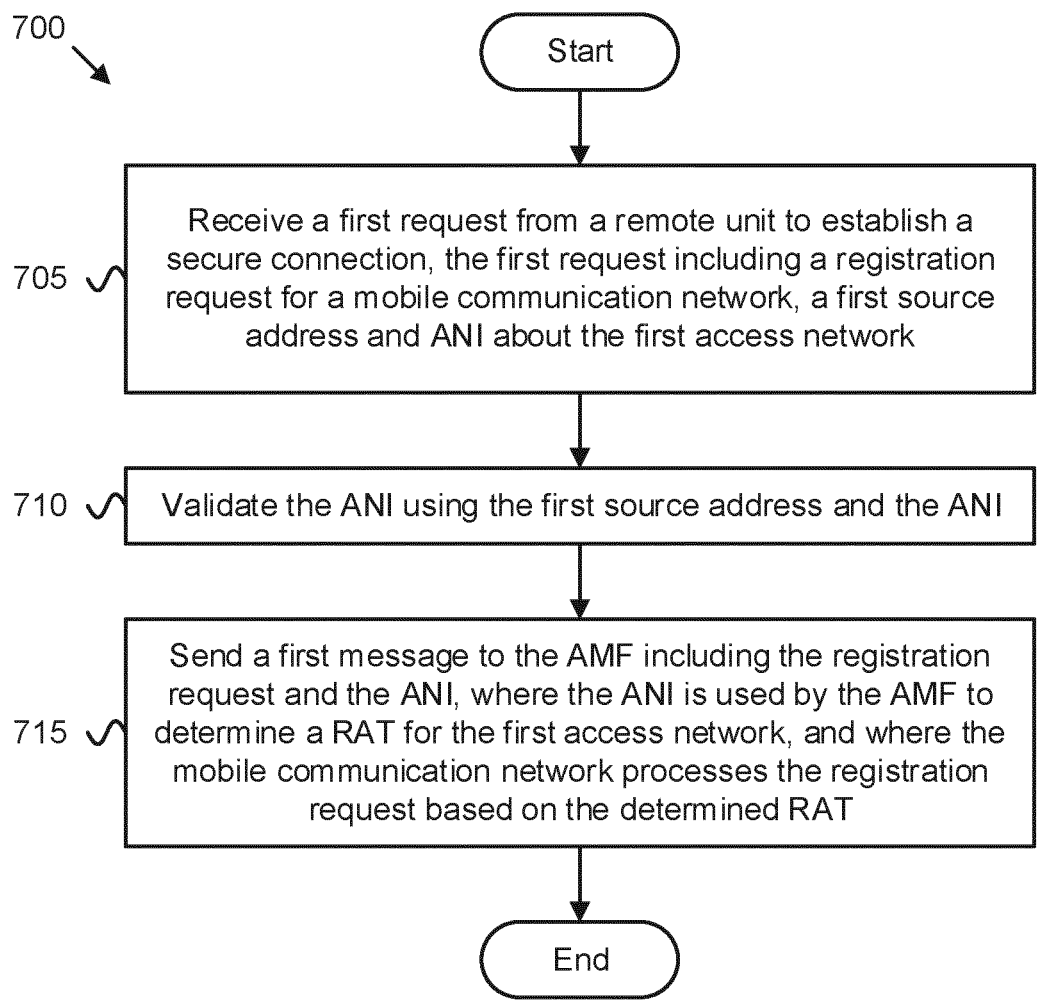
FIG. 7 is a flow chart diagram illustrating one embodiment of a second method for determining a RAT for an untrusted access network.

FIG. 7 depicts a method 700 for determining a RAT for an untrusted access network, according to embodiments of the disclosure. In some embodiments, the method 700 is performed by an interworking device, such as the N3IWF 153, the N3IWF 230, and/or the network apparatus 500. In certain embodiments, the method 700 may be performed by a processor executing program code, for example, a microcontroller, a microprocessor, a CPU, a GPU, an auxiliary processing unit, a FPGA, or the like.

The method 700 begins and receives 705 a first request (e.g., an IKE_AUTH Request) from a remote unit to establish a secure connection. Here, the first request includes a registration request for a mobile communication network, a first source address and ANI about the first access network. The method 700 includes validating 710 the ANI using the first source address and the ANI. The method 700 includes sending 715 a first message to the AMF including the registration request and the ANI, where the ANI is used by the AMF to determine a RAT for the first access network, and where the mobile communication network processes the registration request based on the determined RAT. The method 700 ends.

Figure 8:
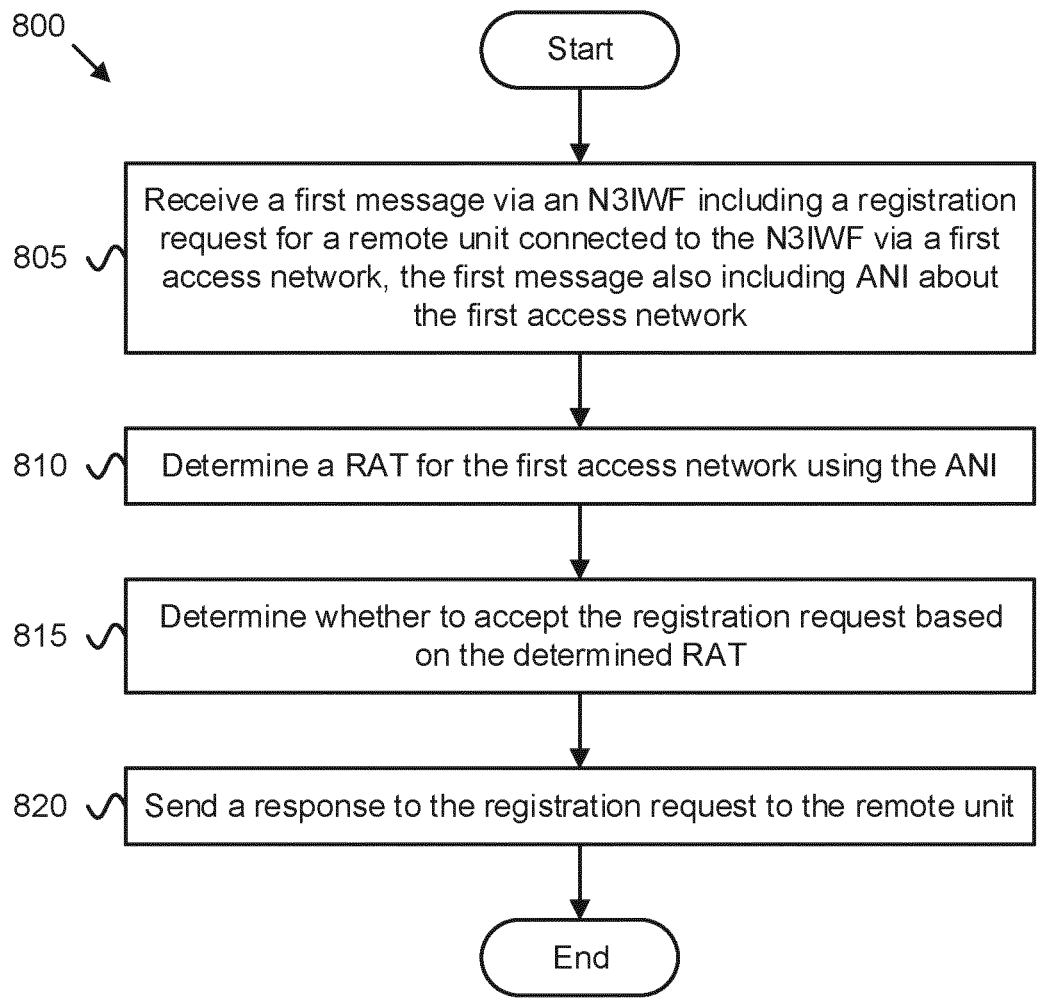
FIG. 8 is a flow chart diagram illustrating one embodiment of a third method for determining a RAT for an untrusted access network.

FIG. 8 depicts a method 800 for determining a RAT for an untrusted access network, according to embodiments of the disclosure. In some embodiments, the method 800 is performed by an access and mobility management function, such as the AMF 143, the AMF 235, and/or the network apparatus 500. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a first message via an N3IWF including a registration request for a remote unit connected to the N3IWF via a first access network. Here, the first message also includes ANI about the first access network. The method 800 includes determining 810 a RAT for the first access network using the ANI. The method 800 includes determining 815 whether to accept the registration request based on the determined RAT. The method 800 includes sending 820 a response to the registration request to the remote unit. The method 800 ends.

Figure 9:
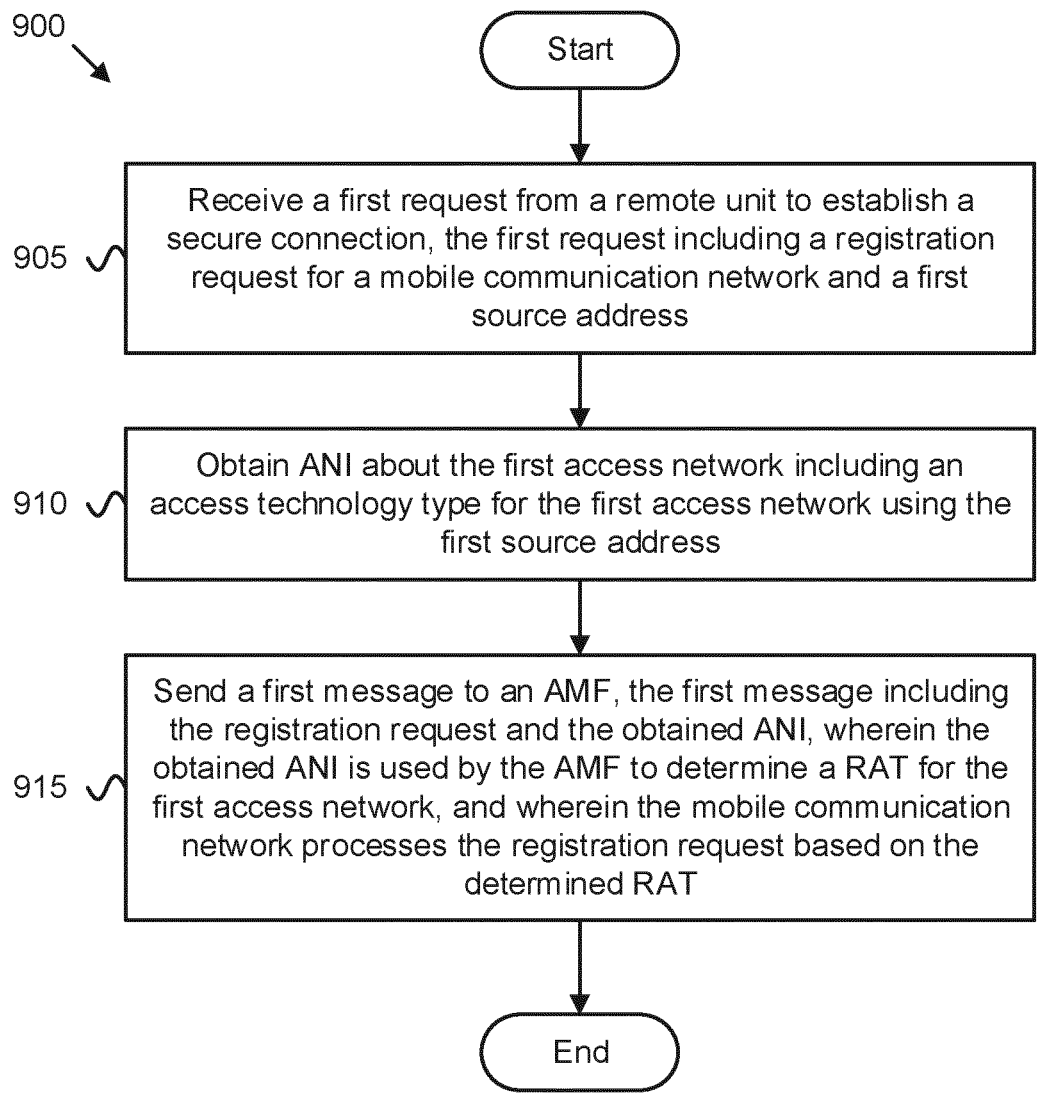
FIG. 9 is a flow chart diagram illustrating one embodiment of a fourth method for determining a RAT for an untrusted access network.

FIG. 9 depicts a method 900 for determining a RAT for an untrusted access network, according to embodiments of the disclosure. In some embodiments, the method 900 is performed by an interworking device, such as the N3IWF 153, the N3IWF 230 and/or the network apparatus 500. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a first request (e.g., an IKE_AUTH Request) from a remote unit to establish a secure connection. Here, the first request contains a registration request for a mobile communication network and a first source address. The method 900 includes obtaining 910 ANI about the first access network including an access technology type for the first access network using the first source address. The method 900 includes sending 915 a first message to an AMF. In such embodiments, the first message includes the registration request and the obtained ANI, wherein the obtained ANI is used by the AMF to determine a RAT for the first access network, and wherein the mobile communication network processes the registration request based on the determined RAT. The method 900 ends.

Disclosed herein is a first apparatus for determining a RAT for an untrusted access network, according to embodiments of the disclosure. The first apparatus may be implemented by the remote unit 105, the UE 205, and/or the user equipment apparatus 400. The first apparatus includes a processor and a transceiver that communicates with a first access network. The processor obtains ANI about the first access network, the ANI including an access technology type for the first access network. The processor determines to register with a mobile communication network (e.g., a 5GC) via the first access network using an untrusted registration procedure and sends a first request (e.g., an IKE_AUTH Request) to establish a secure connection with a N3IWF in the mobile communication network. Here, the first request includes a registration request for the mobile communication network and the obtained ANI, wherein the obtained ANI is used by the mobile communication network to determine a RAT for the first access network. Via the transceiver, the processor receives a response to the registration request after establishing the secure connection with the N3IWF, wherein the response depends on the RAT. For example, based on the RAT, the network may accept or refuse the registration request. As another example, policies may be derived based on the RAT.

In some embodiments, the processor establishes a data connection (e.g., PDU Session) with the mobile communication network via the first access network. In such embodiments, the data connection may be configured to operate based on the RAT. For example, based on the RAT the data connection may be refused or may be accepted. As another example, the data connection may operate under QoS and charging policy that depends on the RAT.

In some embodiments, obtaining the ANI includes querying a server in the first access network, the server including one of: a DHCP server and an ANQP server. In further embodiments, obtaining the ANI includes transmitting a DHCP Request and receiving a DHCP Ack containing an Access-Network-Identifier option (e.g., as defined in RFC 5839). In such embodiments, the ANI is derived based on parameters included in the Access-Network-Identifier option. In certain embodiments, the parameters in the Access-Network-Identifier option include an access technology type, an access network identifier, and an operator identifier.

In some embodiments, obtaining the ANI includes receiving broadcast data from the first access network and deriving the ANI based on parameters in the broadcast data. In some embodiments, the obtained ANI in the first request is validated by the N3IWF, wherein the obtained ANI is used by the mobile communication network to determine a RAT for the first access network only if the obtained ANI is successfully validated.

Disclosed herein is a first method for determining a RAT for an untrusted access network. The first method may be performed by the remote unit 105, the UE 205, and/or the user equipment apparatus 400. The first method includes obtaining ANI about the first access network, the ANI including an access technology type for the first access network. The first method includes determining to register with a mobile communication network (e.g., 5GC) via the first access network using an untrusted registration procedure and sending a first request (e.g., an IKE_AUTH Request) to establish a secure connection with an N3IWF in the mobile communication network. Here, the first request includes a registration request for the mobile communication network and the obtained ANI, wherein the obtained ANI is used by the mobile communication network to determine a RAT for the first access network. The first method includes receiving a response to the registration request after establishing the secure connection with the N3IWF, wherein the response depends on the RAT. For example, based on the RAT, the registration request may be accepted or refused. As another example, the network may derive policies for the UE registration based on the RAT.

In some embodiments, the first method includes establishing a data connection (e.g., PDU Session) with the mobile communication network via the first access network. In such embodiments, the data connection may be configured to operate based on the RAT. For example, based on the RAT the data connection may be refused or may be accepted. As another example, the data connection may operate under QoS and charging policy that depends on the RAT.

In some embodiments, obtaining the ANI may include querying a server in the first access network, the server including one of: a DHCP server and an ANQP server. In further embodiments, obtaining the ANI includes transmitting a DHCP Request and receiving a DHCP Ack containing an Access-Network-Identifier option (e.g., as defined in RFC 5839), wherein the ANI is derived based on parameters included in the Access-Network-Identifier option. In certain embodiments, the parameters in the Access-Network-Identifier option include an access technology type, an access network identifier, and an operator identifier.

In some embodiments, obtaining the ANI includes receiving broadcast data from the first access network and deriving the ANI based on parameters in the broadcast data. In some embodiments, the obtained ANI in the first request is validated by the N3IWF, wherein the obtained ANI is used by the mobile communication network to determine a RAT for the first access network only if the obtained ANI is successfully validated.

Disclosed herein is a second apparatus for determining a RAT for an untrusted access network, according to embodiments of the disclosure. The second apparatus may be implemented by the N3IWF 153, the N3IWF 230 and/or the network apparatus 500. The second apparatus includes a first network interface that communicates with a remote unit via a first access network and a second network interface that communicates with an AMF in a mobile core network. The second apparatus also includes a processor that receives a first request (e.g., an IKE_AUTH Request) from the remote unit to establish a secure connection. Here, the first request includes a registration request for the mobile communication network, a first source address and ANI about the first access network. The processor validates the ANI using the first source address and the ANI and sends a first message to the AMF including the registration request and the ANI, where the ANI is used by the AMF to determine a RAT for the first access network, and where the mobile communication network processes the registration request based on the determined RAT.

In some embodiments, the ANI includes an operator identifier. In such embodiments, validating the ANI includes comparing the first source address with a pre-configured address space selected using the operator identifier, wherein the ANI is successfully validated in response to the first source address belonging to the pre-configured address space. In some embodiments, the first message to the AMF includes an indication of whether the ANI was successfully validated, wherein the AMF further determines the RAT based on whether the ANI was successfully validated. In certain embodiments, the first source address is the source IP address of the packet that contains the first request (e.g., IKE_AUTH Request). Note that first source address will not be the IP address of the UE if a Network Address Translator exists in the data path.

Disclosed herein is a second method for determining a RAT for an untrusted access network, according to embodiments of the disclosure. The second method may be performed by the N3IWF 153, the N3IWF 230 and/or the network apparatus 500. The second method includes receiving a first request (e.g., an IKE_AUTH Request) from a remote unit to establish a secure connection. Here, the first request includes a registration request for a mobile communication network, a first source address and ANI about the first access network. The second method includes validating the ANI using the first source address of the remote unit and the ANI and sending a first message to the AMF including the registration request and the ANI, where the ANI is used by the AMF to determine a RAT for the first access network, and where the mobile communication network processes the registration request based on the determined RAT.

In some embodiments, the ANI includes an operator identifier, wherein validating the ANI includes comparing the first source address with a pre-configured address space selected using the operator identifier, wherein the ANI is successfully validated in response to the first source address belonging to the pre-configured address space. In some embodiments, the first message to the AMF includes an indication of whether the ANI was successfully validated, wherein the AMF further determines the RAT based on whether the ANI was successfully validated.

Disclosed herein is a third apparatus for determining a RAT for an untrusted access network, according to embodiments of the disclosure. The third apparatus may be implemented by the AMF 143, the AMF 235, and/or the network apparatus 500. The third apparatus includes a first network interface that communicates with a N3IWF in a mobile communication network and a processor that receives a first message via the N3IWF including a registration request for a remote unit connected to N3IWF via a first access network. Here, the first message also includes ANI about the first access network. The processor determines a RAT for the first access network using the ANI and determines whether to accept the registration request based on the determined RAT. Via the first network interface, the processor sends to the remote unit a response to the registration request.

In some embodiments, receiving the first message includes receiving an indication from the N3IWF of whether the ANI was successfully validated. In such embodiments, determining the RAT is further based on whether the ANI was successfully validated. In some embodiments, the processor further sends a policy request to a policy control function via a second network interface, the policy request including the RAT, wherein the policy control function derives an access management policy for the remote unit based on the RAT.

In some embodiments, the processor further receives via the N3IWF a request to establish a data connection (e.g., a PDU session) for the remote unit and sends a session context create request to a session management function via a second network interface. In such embodiments, the session context create request including the RAT, wherein the session management function derives a session context including session management policy for the data connection based on the RAT.

Disclosed herein is a third method for determining a RAT for an untrusted access network, according to embodiments of the disclosure. The third method may be performed by the AMF 143, the AMF 235, and/or the network apparatus 500. The third method includes receiving a first message via a N3IWF including a registration request for a remote unit connected to the N3IWF via a first access network. Here, the first message also includes ANI about the first access network. The third method includes determining a RAT for the first access network using the ANI. The third method includes determining whether to accept the registration request based on the determined RAT and sending to the remote unit a response to the registration request.

In some embodiments, receiving the first message includes receiving an indication from the N3IWF of whether the ANI was successfully validated. In such embodiments, determining the RAT is further based on whether the ANI was successfully validated. In some embodiments, the third method includes sending a policy request to a policy control function via a second network interface, the policy request including the RAT, wherein the policy control function derives an access management policy for the remote unit based on the RAT.

In some embodiments, the third method includes receiving via the N3IWF a request to establish a data connection (e.g., a PDU session) for the remote unit. In such embodiments, the third method includes sending a session context create request to a session management function via a second network interface, the session context create request including the RAT, wherein the session management function derives a session context including session management policy for the data connection based on the RAT.

Disclosed herein is a fourth apparatus for determining a RAT for an untrusted access network, according to embodiments of the disclosure. The fourth apparatus may be implemented by the N3IWF 153, the N3IWF 230 and/or the network apparatus 500. The fourth apparatus includes a first network interface that communicates with a remote unit via a first access network and a second network interface that communicates with an AMF in a mobile core network. The fourth apparatus includes a processor that receives a first request (e.g., an IKE_AUTH Request) from a remote unit to establish a secure connection. Here, the first request includes a registration request for the mobile communication network and a first source address. The processor obtains ANI about the first access network including an access technology type for the first access network using the first source address and sends a first message to the AMF including the registration request and the obtained ANI, wherein the obtained ANI is used by the AMF to determine a RAT for the first access network, and wherein the mobile communication network processes the registration request based on the determined RAT.

In some embodiments, obtaining the ANI includes using a pre-configured table that contains the ANI for a first address space, wherein the first source address belongs to the first address space.

Disclosed herein is a fourth method for determining a RAT for an untrusted access network, according to embodiments of the disclosure. The fourth method may be performed by the N3IWF 153, the N3IWF 230 and/or the network apparatus 500. The fourth method includes receiving a first request (e.g., an IKE_AUTH Request) from a remote unit to establish a secure connection. Here, the first request includes a registration request for a mobile communication network and a first source address. The fourth method includes obtaining ANI about the first access network including an access technology type for the first access network using the first source address and sending a first message to an AMF. In such embodiments, the first message includes the registration request and the obtained ANI, wherein the obtained ANI is used by the AMF to determine a RAT for the first access network, and wherein the mobile communication network processes the registration request based on the determined RAT.

In some embodiments, obtaining the ANI includes using a pre-configured table that contains the ANI for a first address space, wherein the first source address belongs to the first address space.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
    at least one memory; and
    at least one processor coupled with the at least one memory and configured to cause the UE to:
    receive, from a first access network, broadcast data comprising one or more parameters;
    derive access network information ("ANI") of the first access network based on the one or more parameters received in the broadcast data from the first access network, the ANI comprising an access technology type for the first access network, an access network identifier of the first access network, an access operator identifier of an operator of the first access network;
    determine to register with a public land mobile network ("PLMN") via the first access network using an untrusted registration procedure;
    transmit a first request to establish a secure connection with a non-3GPP interworking function ("N3IWF") in the PLMN, the first request including a registration request for the PLMN, information for selecting a first access and mobility function ("AMF") in the PLMN, and the derived ANI; and
    receive, from the first AMF, a response to the registration request after establishing the secure connection with the N3IWF, wherein the response to the registration request is based on the access technology type for the first access network.

2. The UE of claim 1, wherein the at least one processor is configured to cause the UE to establish a data connection with the PLMN via the first access network, wherein the data connection is configured to operate based on a radio access type of the first access network.

3. The UE of claim 1, wherein the at least one processor is configured to cause the UE to query a server in the first access network, the server comprising a dynamic host configuration protocol ("DHCP") server or an access network query protocol ("ANQP") server.

4. The UE of claim 3, wherein the at least one processor is configured to cause the UE to:
    transmit a DHCP Request;
    receive a DHCP Acknowledgement message containing an Access-Network-Identifier option; and
    derive the ANI based at least in part on one or more parameters included in the Access-Network-Identifier option.

5. The UE of claim 4, wherein the one or more parameters in the Access-Network-Identifier option comprise one or more of: the access technology type, the access network identifier, or the access operator identifier.

6. A method performed by a user equipment ("UE"), the method comprising:
    receiving, from a first access network, broadcast data comprising one or more parameters;
    deriving access network information ("ANI") of the first access network based on the one or more parameters received in the broadcast data from the first access network, the ANI comprising an access technology type for the first access network, an access network identifier of the first access network, and an access operator identifier of an operator of the first access network;

determining to register with a public land mobile network ("PLMN") via the first access network using an untrusted registration procedure;

transmitting a first request to establish a secure connection with a non-3GPP interworking function ("N3IWF") in the PLMN, the first request including a registration request for the PLMN, information for selecting a first access and mobility function ("AMF") in the PLMN, and the derived ANI; and receiving, from the first AMF, a response to the registration request after establishing the secure connection with the N3IWF, wherein the response to the registration request is based on the access technology type for the first access network.

7. The method of claim 6, further comprising establishing a data connection with the PLMN via the first access network, wherein the data connection is configured to operate based on a radio access type of the first access network.

8. The method of claim 6, further comprising querying a server in the first access network, the server comprising a dynamic host configuration protocol ("DHCP") server or an access network query protocol ("ANQP") server.

9. The method of claim 8, further comprising:
transmitting a DHCP Request;
receiving a DHCP Acknowledgment message containing an Access-Network-Identifier option; and
deriving the ANI based at least in part on one or more parameters included in the Access-Network-Identifier option.

10. The method of claim 9, wherein the one or more parameters in the Access-Network-Identifier option comprise one or more of: the access technology type, the access network identifier, or the access operator identifier.

11. An interworking apparatus comprising:
at least one memory;
at least one processor coupled with the at least one memory and configured to cause the interworking apparatus to:
receive, from a user equipment ("UE") and via a first access network, a first request to establish a secure connection, wherein the first request comprises a registration request for a public land mobile network ("PLMN"), information for selecting a first access and mobility function ("AMF") in the PLMN, a first source address, and access network information ("ANI") about the first access network, and wherein the ANI comprises an access technology type for the first access network, an access network identifier of the first access network, and an access operator identifier of an operator of the first access network;
validate the ANI using the first source address and the access operator identifier, wherein validating the ANI comprises comparing the first source address with a pre-configured address space selected using the access operator identifier;

select the first AMF in the PLMN based on the first request;
transmit, to the first AMF, a first message including the registration request and the ANI, wherein the ANI is indicative of a radio access type ("RAT") for the first access network; and
forward, to the UE, a response to the registration request after establishing the secure connection, wherein the response to the registration request is received from the first AMF and is based on the access technology type for the first access network.

12. The interworking apparatus of claim 11, wherein the at least one processor is configured to successfully validate the ANI in response to the first source address belonging to the pre-configured address space.

13. The interworking apparatus of claim 11, wherein the first message to the AMF includes an indication of whether the ANI was successfully validated.

14. A method performed by an interworking apparatus, the method comprising:
receiving, from a user equipment ("UE") and via a first access network, a first request to establish a secure connection, wherein the first request comprises a registration request for a public land mobile network ("PLMN"), information for selecting a first access and mobility function ("AMF") in the PLMN, a first source address, and access network information ("ANI") about the first access network, and wherein the ANI comprises an access technology type for the first access network, an access network identifier of the first access network, and an access operator identifier of an operator of the first access network;
validating the ANI using the first source address and the access operator identifier, wherein validating the ANI comprises comparing the first source address with a pre-configured address space selected using the access operator identifier;
selecting the first AMF in the PLMN based on the first request;
transmitting, to the first AMF, a first message including the registration request and the ANI, wherein the ANI is indicative of a radio access type ("RAT") for the first access network; and
forwarding, to the UE, a response to the registration request after establishing the secure connection, wherein the response to the registration request is received from the first AMF and is based on the access technology type for the first access network.

15. The method of claim 14, further comprising successfully validating the ANI in response to the first source address belonging to the pre-configured address space.

16. The method of claim 14, wherein the first message to the AMF includes an indication of whether the ANI was successfully validated.

* * * * *